United States Patent
Chang et al.

(10) Patent No.: US 8,308,338 B2
(45) Date of Patent: Nov. 13, 2012

(54) LIGHT GUIDE PLATE AND BACKLIGHT MODULE

(75) Inventors: Liang-Kang Chang, Hsin-Chu (TW); Hao-Jan Kuo, Hsin-Chu (TW); Ming-Dah Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 188 days.

(21) Appl. No.: 12/833,468

(22) Filed: Jul. 9, 2010

(65) Prior Publication Data
US 2011/0085350 A1    Apr. 14, 2011

(30) Foreign Application Priority Data
Oct. 9, 2009    (TW) ................. 98134235 A

(51) Int. Cl.
*F21V 7/00* (2006.01)
*F21V 7/04* (2006.01)

(52) U.S. Cl. .................. 362/623; 362/626; 362/629

(58) Field of Classification Search .......... 362/623–626, 362/629
See application file for complete search history.

(56) References Cited

U.S. PATENT DOCUMENTS

| | | | |
|---|---|---|---|
| 6,259,854 B1 * | 7/2001 | Shinji et al. | 385/146 |
| 6,612,722 B2 * | 9/2003 | Ryu et al. | 362/331 |
| 6,877,871 B2 * | 4/2005 | Ohkawa | 362/614 |
| 7,393,130 B2 * | 7/2008 | Hasei | 362/619 |
| 7,438,459 B2 * | 10/2008 | Hwang et al. | 362/613 |
| 7,517,125 B2 * | 4/2009 | Hasei et al. | 362/558 |
| 7,556,417 B2 * | 7/2009 | Chang | 362/615 |
| 2006/0291239 A1 * | 12/2006 | Hasei et al. | 362/600 |
| 2009/0021958 A1 * | 1/2009 | Chang | 362/607 |
| 2009/0067196 A1 * | 3/2009 | Takada et al. | 362/624 |
| 2011/0019435 A1 * | 1/2011 | Teng et al. | 362/608 |

FOREIGN PATENT DOCUMENTS

| | | |
|---|---|---|
| CN | 1892357 | 1/2007 |
| TW | 200732785 | 9/2007 |
| TW | I294402 | 3/2008 |
| TW | M345244 | 11/2008 |

* cited by examiner

*Primary Examiner* — David J Makiya
(74) *Attorney, Agent, or Firm* — Muncy, Geissler, Olds & Lowe, PLLC

(57) ABSTRACT

A light guide plate includes a transparent substrate and a plurality of micro structures. The transparent substrate has a first surface and a second surface opposite the first surface, and the micro structures are disposed at least on the first surface of the transparent substrate and are separate from each other. Each of the micro structures includes a first coating layer and a second coating layer. The first coating layer is formed on the first surface and includes an adhesive material. The second coating layer is formed on at least a part of the first coating layer and includes a light-diffusing material.

17 Claims, 7 Drawing Sheets

LIGHT GUIDE PLATE AND BACKLIGHT MODULE

CROSS REFERENCE TO RELATED APPLICATION

This application claims priority of application No. 098134235 filed in Taiwan R.O.C on Oct. 9, 2009 under 35 U.S.C. §119; the entire contents of which are hereby incorporated by reference.

BACKGROUND OF THE INVENTION a. Field of the Invention

The invention relates to a light guide plate and a backlight module with the light guide plate.

b. Description of the Related Art

FIG. 1 shows a three-dimensional diagram of a conventional backlight module 20. Referring to FIG. 1, the backlight module 20 has a back plate 21. A light guide plate 22, a reflective sheet 23, a light source 24, and a set of optical films such as a diffuser 25 and a brightness enhancement film 26 are disposed in the back plate 21. The diffuser 25 is adjacent to a light-emitting side of the light guide plate 22, the reflective sheet 23 is adjacent to a bottom surface 22a of the light guide plate 22, and the light source 24 is adjacent to a light incident side of the light guide plate 22. The light guide plate 22 is a transparent substrate and guides light beams emitted from the light source 24. The light beams enter the light guide plate 22 from the light incident side of the light guide plate 22, leave the light guide plate 22 via a top surface (light-emitting side) of the light guide plate 22, and passes the diffuser 25 and the brightness enhancement film 26 in succession to improve output luminance and illumination uniformity of the backlight module 20. In conventional designs, micro structures are formed on the bottom surface 22a of the light guide plate 22 to improve the illumination uniformity of the backlight module 20. For example, Taiwan patent no. TWI294402 discloses an optics made by micro droplet inkjet, wherein micro structures are formed by micro droplets falling on a surface of a transparent substrate. Besides, Taiwan patent no. TWM345244 discloses a light guide plate, where a bottom surface of the light guide plate is an ink layer and semispherical patterns are formed as micro structures on the surface of the ink layer. Further, Taiwan patent publication no. 200732785 discloses a fabrication process of forming micro bumps on a light guide plate by inkjet or dispensing process.

However, the configurations of micro structures disclosed in the above designs fail to provide an effective mechanism allowing to regionally adjust output luminance of a light guide plate. Hence, the illumination uniformity of the light guide plate may not be further improved.

BRIEF SUMMARY OF THE INVENTION

The invention provides a light guide plate and a backlight module, and the light guide plate and the backlight module have excellent illumination uniformity.

According to an embodiment of the invention, a light guide plate includes a transparent substrate and a plurality of micro structures. The transparent substrate has a first surface and a second surface opposite the first surface, and the micro structures are disposed at least on the first surface of the transparent substrate and are separated from each other. Each of the micro structures includes a first coating layer and a second coating layer. The first coating layer is formed on the first surface and includes an adhesive material. The second coating layer is formed on at least a part of the first coating layer and includes a light-diffusing material.

According to another embodiment of the invention, a light guide plate includes a transparent substrate, a plurality of first micro structures, and a plurality of second micro structures. The transparent substrate has a first surface and a second surface opposite the first surface. Each of the first micro structures includes a first coating layer and a second coating layer. The first coating layer is formed on the first surface and includes an adhesive material. The second coating layer is formed on at least a part of the first coating layer and includes a light-diffusing material. The second micro structures are made of the adhesive material and may not contain the light-diffusing material.

According to another embodiment of the invention, a backlight module includes a light guide plate and a light source. The light guide plate includes a transparent substrate and a plurality of micro structures. The light source is disposed at one side of the transparent substrate and faces to the light incident surface. The transparent substrate has a bottom surface, a light incident surface, and a light-emitting surface opposite the bottom surface, and a light incident surface connecting the bottom surface and the light emitting surface. The micro structures are disposed on the bottom surface of the transparent substrate and each of the micro structures includes a first coating layer and a second coating layer. The first coating layer is formed on the bottom surface and includes an adhesive material. The second coating layer is formed on at least a part of the first coating layer and includes a light-diffusing material. The light source is capable of emitting a light beam. The light beam is capable of entering the transparent substrate from the light incident surface, being deflected by the micro structures, and leaving the transparent substrate via the light-emitting surface.

In one embodiment, each of the micro structures has distinct adhesive materials or distinct light-diffusing materials.

In one embodiment, the index of refraction of the first coating layer is substantially the same as the index of refraction of the transparent substrate.

In one embodiment, the width of the first coating layer or the second coating layer is about 0.1-500 μm, and the thickness of the first coating layer or the second coating layer is about 0.1-50 μm.

According to the above embodiments, since the second coating layer may be formed or not formed on the first coating layer, the adhesive material of the first coating layer and the light-diffusing material of the second coating layer may be arbitrarily selected, and the shape and size of the first coating layer are adjustable, the micro structures having various light-diffusing capabilities are obtained to achieve an effectively regional luminance adjustment and to improve the illumination uniformity of a light guide plate as a result.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
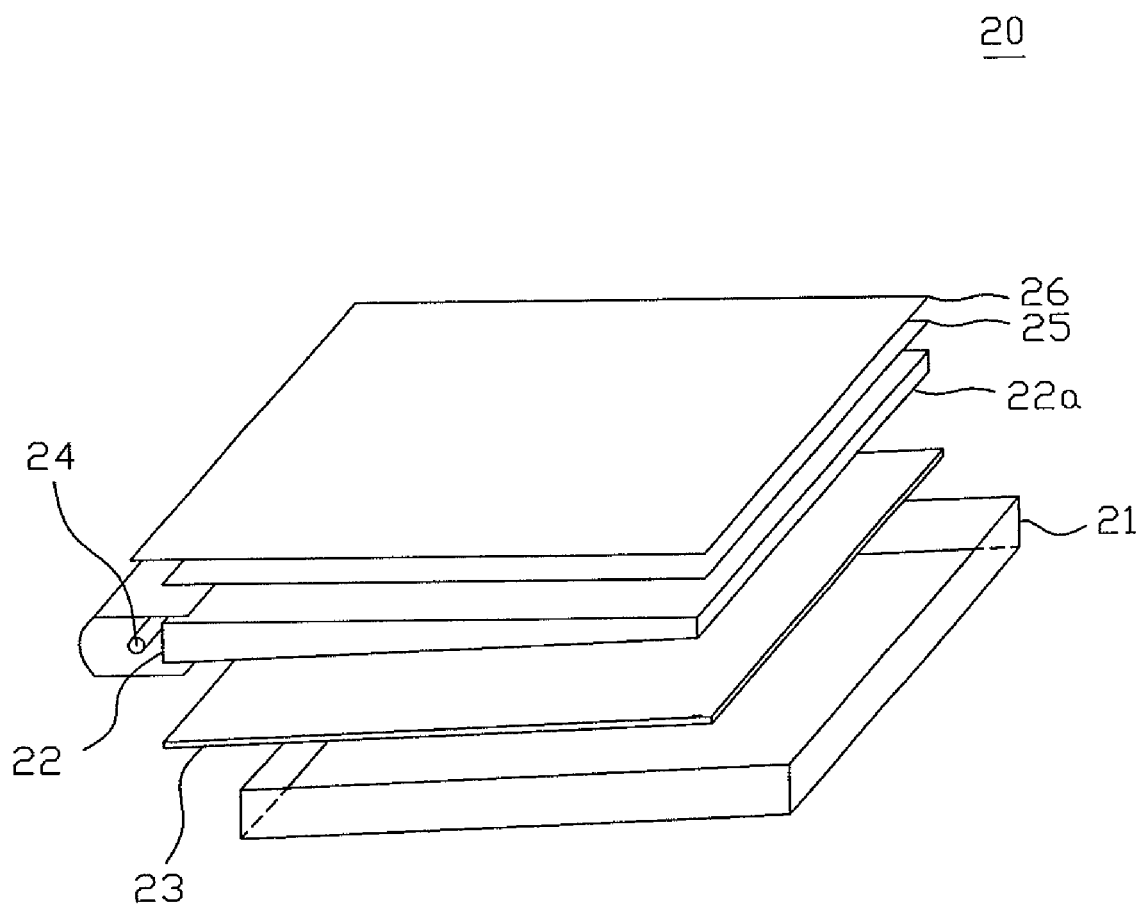
FIG. 1 shows a three-dimensional diagram of a conventional backlight module.
Figure 2A:
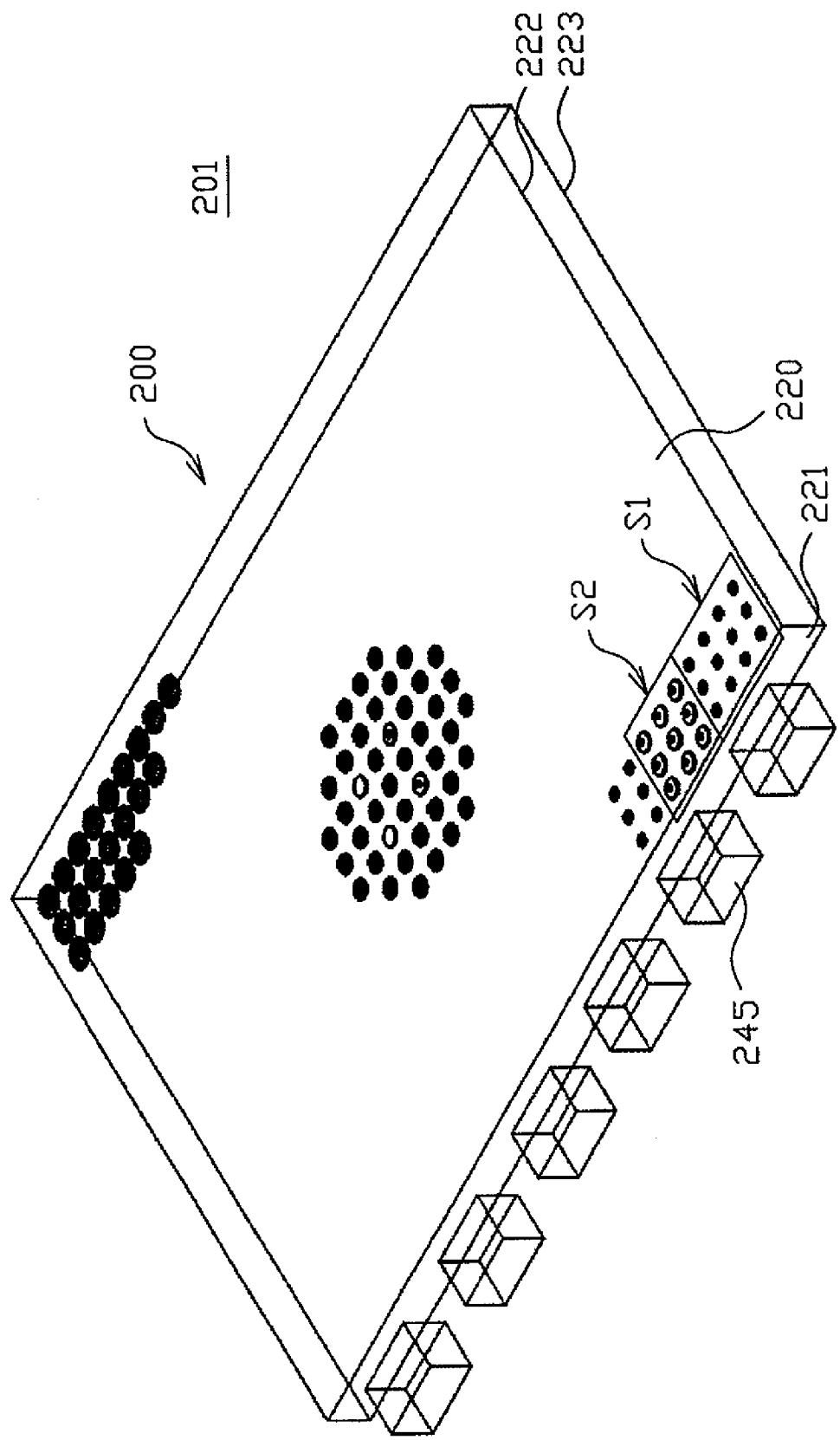
FIG. 2A shows a schematic diagram of a backlight module according to an embodiment of the invention.
Figure 2B:
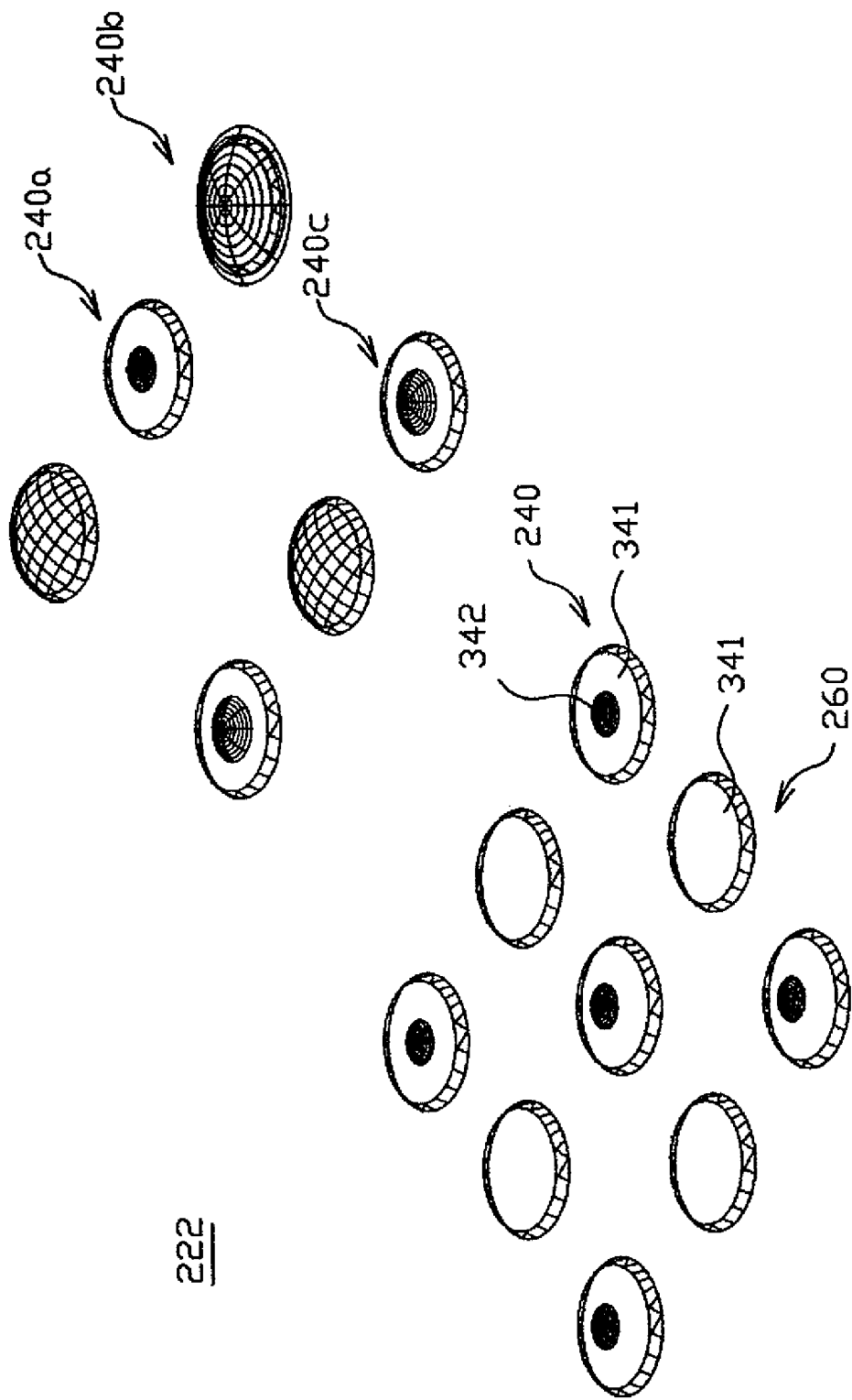
FIG. 2B shows a schematic diagram illustrating the configuration of micro structures according to an embodiment of the invention.

Referring to both FIG. 2A and FIG. 2B, the backlight module 201 includes a light guide plate 200 and a light source 245. The light guide plate 200 includes a transparent substrate 220, and the transparent substrate 220 has a bottom surface 222, a light-emitting surface 223, and a light incident surface 221. The light-emitting surface 223 is opposite the bottom surface 222, and the light incident surface 221 is connected to the bottom surface 222 and the light-emitting surface 223. The light source 245 is disposed on one side of the transparent substrate 220 and faces the light incident surface 221 of the transparent substrate 220. A plurality of micro structures separated from each other is spread on the bottom surface 222 of the transparent substrate 220. Each of the micro structures may have different configurations, shapes and materials from each other. A first micro structure 240 and a second micro structure 260 are described as an example below. Referring to FIG. 2B, the first micro structure 240 includes a first coating layer 341 and a second coating layer 342. The first coating layer 341 is formed on the bottom surface 222 of the transparent substrate 220, and the second coating layer 342 is formed on a part of the first coating layer 341. The first coating layer 341 is transparent and contains an adhesive material, so the second coating layer 342 is allowed to adhere to the first coating layer 341 after the first coating layer 341 is formed on the bottom surface 222. The first coating layer 341 may be, for instance, formed by ejection or dispensing process. Further, the index of refraction of the first coating layer 341 is substantially the same as the index of refraction of the transparent substrate 220 to reduce energy loss of light beams emitted from the transparent substrate 220. In one embodiment, the width of the first coating layer 341 is about 0.1-500 μm, and the thickness of the first coating layer 341 is about 0.1-50 μm. The second coating layer 342 contains a light-diffusing material to diffuse light beams. The diffusion light beams are further reflected or refracted to emit form the light-emitting surface 223. Since the second coating layer 342 is formed on the first coating layer 341, the spread area of the second coating layer 342 is equal to or smaller than the spread area of the first coating layer 341. In one embodiment, the width of the second coating layer 342 is about 0.1-500 μm, and the thickness of the second coating layer 342 is about 0.1-50 μm. In comparison, the second micro structure 260 only has the first coating layer 341 but does not have the second coating layer 342. In other words, among the micro structures on the bottom surface 222 of the transparent substrate 220, the second coating layer 342 may be disposed or not disposed on the first coating layer 341. Hence, since the first micro structure 240 provides light-diffusing effect but the second micro structure 260 does not, the first micro structure 240 and the second micro structure 260 may be arbitrarily selected to spread on different areas of the bottom surface 222 of the transparent substrate 220 to regionally adjust the output luminance of the light guide plate 200. As a result, the illumination uniformity of the light guide plate 200 is considerably improved.

Figure 3:
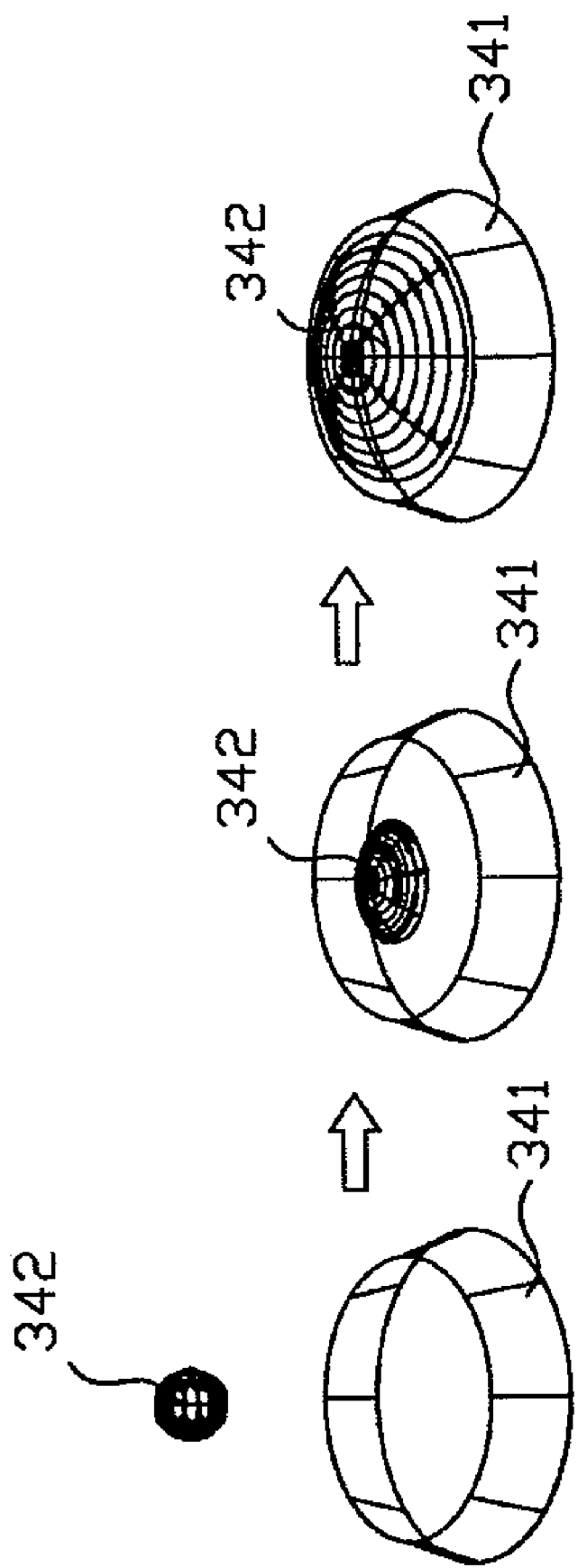
FIG. 3 shows a flow chart illustrating the formation of micro structures according to an embodiment of the invention.
Figure 4:
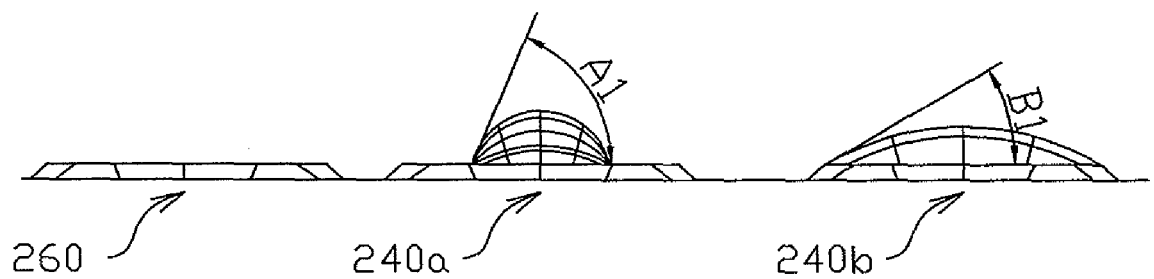
FIG. 4 shows a cross-section view of micro structures.

Referring to FIG. 3, first, the first coating layer 341 is formed on the bottom surface 222 by inkjet, dispensing process, photoresist patterning, chemical etching, etc. Then, a droplet forming the second coating layer 342 falls on the first coating layer 341, and, at this time, the spread area and shape of the second coating layer 342 on the first coating layer 341 vary according to the surface tension of the first coating layer 341, with the magnitude of the surface tension depending on the selection of materials of the first coating layer 341. For example, as shown in FIG. 2B, the first coating layers 341 of the first micro structure 240a, 240b and 240c have three distinct materials, so the area of the second coating layer 342 of the first micro structure 240b is larger than the area of the second coating layer 342 of the first micro structure 240c, and the area of the second coating layer 342 of the first micro structure 240c is larger than the area of the second coating layer 342 of the first micro structure 240a. Similarly, the spread area and shape of the second coating layer 342 on the first coating layer 341 vary according to the material selection of the droplet of the second coating layer 342. Since the material selection of the first coating layer 341 and the second coating layer 342 allows the magnitude of surface tension at the interface to be changed, the spread area and shape of the second coating layer 342 on the first coating layer 341 is allowed to be adjusted as a result. Referring to FIG. 4, when the second coating layers 342 of the first micro structure 240a and the first micro structure 240b have distinct materials, the thickness of the second coating layer 342 of the first micro structure 240b is smaller than the thickness of the second coating layer 342 of the first micro structure 240a, and thus a contact angle B1 of the second coating layer 342 of the first micro structure 240b is smaller than a contact angle A1 of the second coating layer 342 of the first micro structure 240a. Since a microstructure having a larger contact angle provides higher light-diffusing capability, the selection of different materials results in different contact angles of the second coating layer 342, and the micro structures may have various light-diffusing capabilities as a result. Under the circumstance, when the first micro structure 240a (with a large contact angle) and the first micro structure 240b (with a small contact angle) are arbitrarily selected to spread on different areas of the bottom surface 222 of the light guide plate 200, or the distribution densities of the first micro structure 240a and the first micro structure 240b in a selected area are adjusted, the output luminance of the light guide plate 200 is allowed to be regionally adjusted, and the illumination uniformity of the light guide plate 200 is considerably improved.

Figure 5:
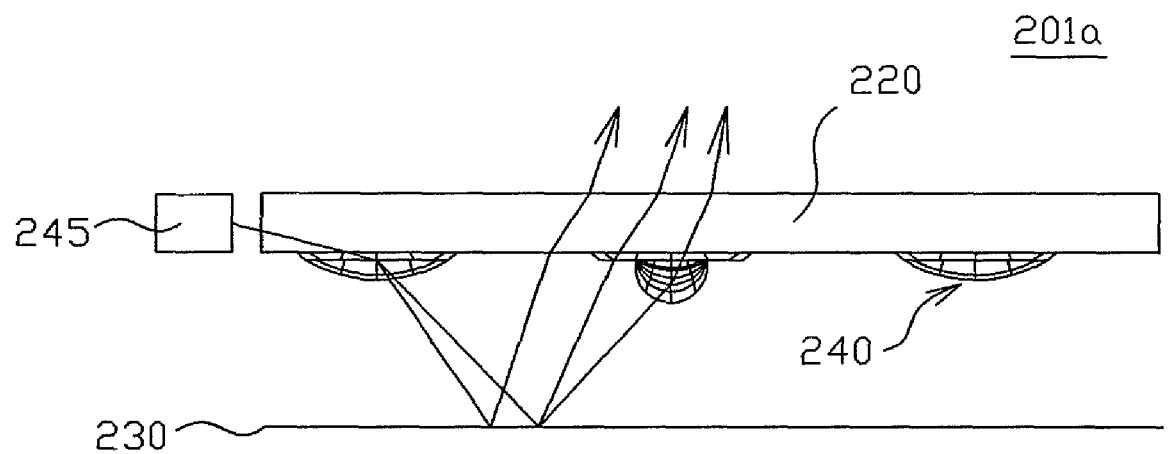
FIG. 5 shows a side view of a backlight module according to an embodiment of the invention.

The backlight module 201a shown in FIG. 5 is similar to the backlight module 201 shown in FIG. 2A, and thus same elements appeared in these two figures are denoted as same numerals. In this embodiment, the backlight module 201a further includes a reflective sheet 230 used for reflecting light beams from the light guide plate 200. Since the different first micro structures 240 disposed on the bottom surface 222 of the light guide plate 200 have different light-diffusing capabilities, an effective mechanism allowing to regionally adjust output luminance of the light guide plate 200 is also provided.

Referring to FIG. 2A again, in one embodiment, the light source 245 may be a point light source such as a light emitting diode, and the bottom surface 222 of the light guide plate 200 may be divided into a first region S1 corresponding to a light source 245 and a second region S2 corresponding to a gap between two adjacent light sources 245. Since the brightness of the first region S1 is different from the brightness of the second region S2, the first region S1 and the second region S2 are spread with different micro structures having distinct configurations to equalize the brightness of the first region S1 and the second region S2. The micro structures having distinct configurations to regionally adjust output luminance are illustrated in the above embodiments. For example, the second coating layers 342 have distinct materials and the first coating layers 341 have identical materials, or the first coating layers 341 have distinct materials and the second coating layers 342 have identical materials. Alternatively, the micro structure without the second coating layer 342 is selectively disposed to adjust output luminance.

Figure 6:
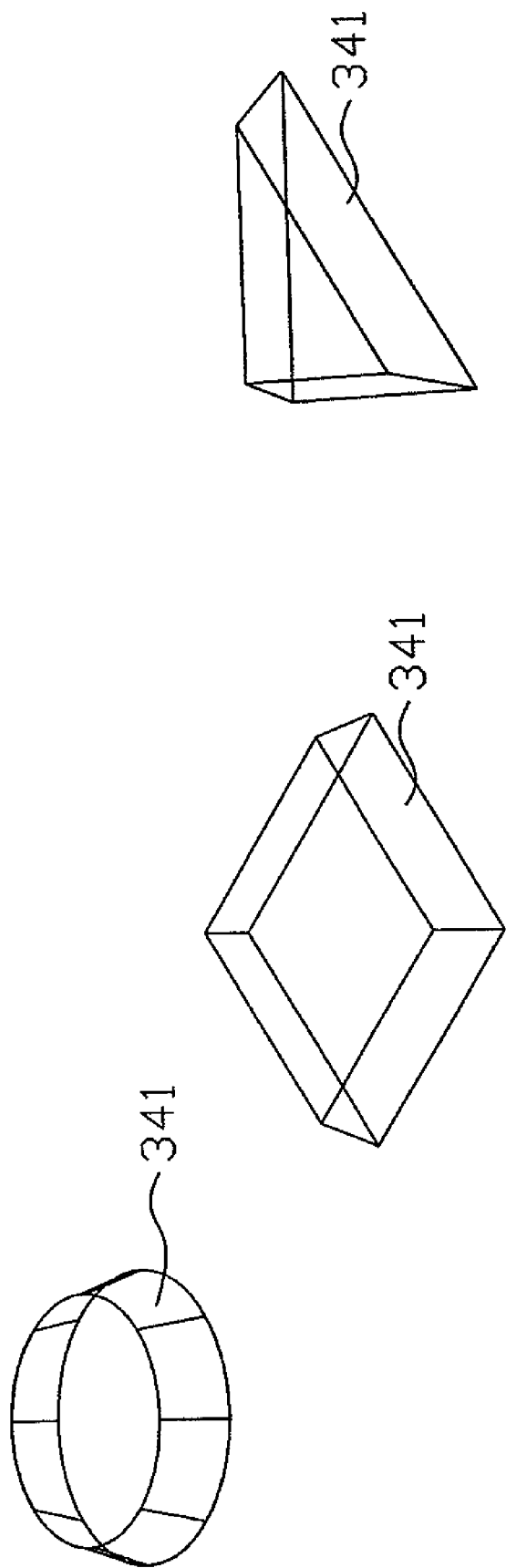
FIG. 6 shows schematic diagrams illustrating different shapes of a first coating layer according to different embodiments of the invention.
Figure 7:
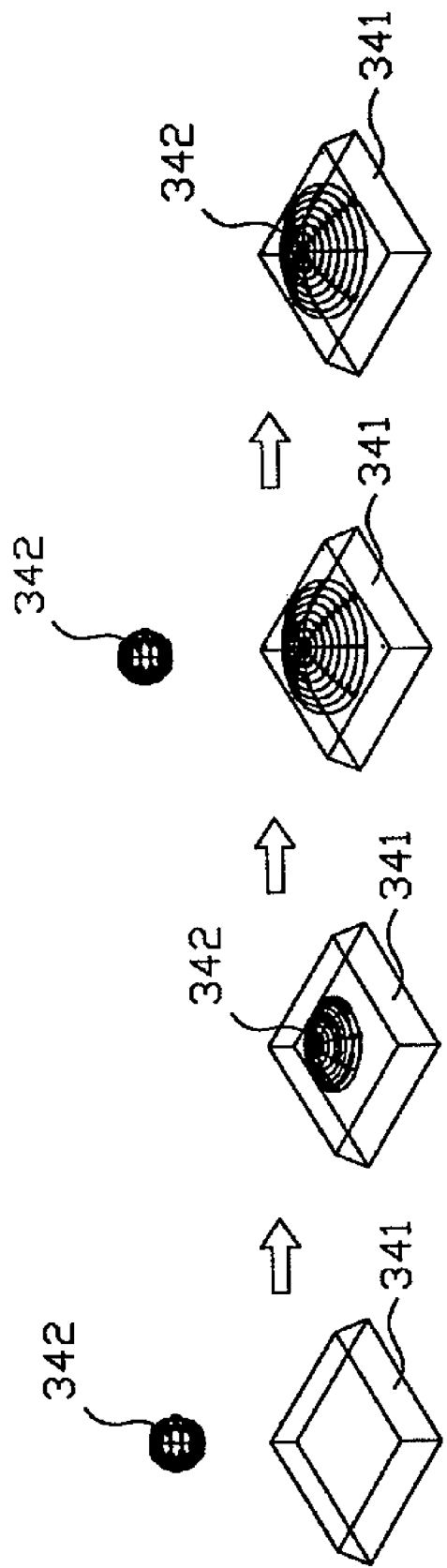
FIG. 7 shows a flow chart illustrating the formation of micro structures according to another embodiment of the invention.

Further, the shape of the first coating layers 341 of each of the micro structures on the transparent substrate 220 includes, but is not limited to, a circle, a rectangle, and a triangle shown in FIG. 6. Besides, the shape and size of the first coating layer 341 may restrict the shape and size of the second coating layer 342. For example, as shown in FIG. 7, in case the first coating layer 341 has the shape of a rectangle, the second coating layer 342 is confined by the first coating layer 341 to have a different shape, size and thickness compared with the second coating layer 342 shown in FIG. 3 (the first coating layer 341 is in the shape of a circle), when a droplet forming the second coating layer 342 falls on the first coating layer 341.

According to the above embodiments, since the second coating layer 342 may be formed or not formed on the first coating layer 341, the adhesive material of the first coating layer 341 and the light-diffusing material of the second coating layer 342 may be arbitrarily selected, and the shape and size of the first coating layer 341 are adjustable, the micro structures having various light-diffusing capabilities are obtained to achieve an effectively regional luminance adjustment and to improve the illumination uniformity of a light guide plate as a result.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light guide plate, comprising:
   a transparent substrate having a first surface and a second surface opposite the first surface; and
   a plurality of first micro structures, disposed at least on the first surface of the transparent substrate, the first micro structures being separate from each other and each of the first micro structures comprising:
   a first coating layer formed on the first surface and comprising an adhesive material; and
   a second coating layer formed on at least a part of the first coating layer and comprising a light-diffusing material; and
   a plurality of second micro structures that are different to the first micro structures, the second micro structures disposed at least on the first surface of the transparent substrate, the second micro structures being separate from each other and each of the second micro structures comprising:

a first coating layer formed on the first surface and comprising an adhesive material; and a second coating layer formed on at least a part of the first coating layer and comprising a light-diffusing material;

wherein a distribution density of the first micro structures on the transparent substrate is different from a distribution density of the second micro structures on the transparent substrate; wherein the adhesive material of the first micro structures is different from the adhesive material of the second micro structures.

2. The light guide plate of claim 1, wherein the light-diffusing material of the first micro structures is different from the light-diffusing material of the second micro structures.

3. The light guide plate of claim 1, wherein the index of refraction of the first coating layers of the first micro structures and the second micro structures is substantially the same as the index of refraction of the transparent substrate.

4. The light guide plate of claim 1, wherein the width of the first coating layers or the second coating layers of the first micro structures and the second micro structures is about 0.1-500 μm.

5. The light guide plate of claim 1, wherein the thickness of the first coating layers or the second coating layers of the first micro structures and the second micro structures is about 0.1-50 μm.

6. A light guide plate, comprising:
a transparent substrate having a first surface and a second surface opposite the first surface;
a plurality of first micro structures disposed at least on the first surface of the transparent substrate, the first micro structures being separate from each other and each of the first micro structures comprising:
a first coating layer formed on the first surface and comprising an adhesive material; and
a second coating layer formed on at least a part of the first coating layer and comprising a light-diffusing material; and
a plurality of second micro structures disposed at least on the first surface of the transparent substrate, wherein the second micro structures are separate from each other and each of the second micro structures is made of the adhesive material but does not contain the light-diffusing material; wherein the adhesive material of the first micro structures is different from the adhesive material of the second micro structures.

7. The light guide plate of claim 6, wherein a distribution density of the first micro structures on the transparent substrate is different from a distribution density of the second micro structures on the transparent substrate.

8. The light guide plate of claim 6, wherein the index of refraction of the first coating layers of the first micro structures and the second micro structures is substantially the same as the index of refraction of the transparent substrate.

9. The light guide plate of claim 6, wherein the width of the first coating layers or the second coating layers of the first micro structures and the second micro structures is about 0.1-500 μm.

10. The light guide plate of claim 6, wherein the thickness of the first coating layers or the second coating layers of the first micro structures and the second micro structures is about 0.1-50 μm.

11. A backlight module, comprising:
a light guide plate, comprising:
a transparent substrate having a bottom surface, a light-emitting surface and a light incident surface, wherein the light-emitting surface is opposite the bottom surface, and the light incident surface is connected the bottom surface and the light-emitting surface;
a plurality of first micro structures, disposed at least on the bottom surface of the transparent substrate, the first micro structures being separate from each other and each of the first micro structures comprising:
a first coating layer formed on the bottom surface and comprising an adhesive material; and
a second coating layer formed on at least a part of the first coating layer and comprising a light-diffusing material;
a plurality of second micro structures that are different to the first micro structures, the second micro structures disposed at least on the bottom surface of the transparent substrate, the second micro structures being separate from each other and each of the second micro structures comprising:
a first coating layer formed on the bottom surface and comprising an adhesive material; and
a second coating layer formed on at least a part of the first coating layer and comprising a light-diffusing material, wherein a distribution density of the first micro structures on the transparent substrate is different from a distribution density of the second micro structures on the transparent substrate; wherein the adhesive material of the first micro structures is different from the adhesive material of the second micro structures; and
a light source disposed on one side of the transparent substrate, facing the light incident surface, and capable of emitting a light beam, wherein the light beam is capable of entering the transparent substrate from the light incident surface, being deflected by the micro structures, and leaving the transparent substrate via the light-emitting surface.

12. The backlight module of claim 11, wherein the light-diffusing material of the first micro structures is different from the light-diffusing material of the second micro structures.

13. The backlight module of claim 11, wherein the shape of the first coating layer of each of the first micro structures is different from the shape of the first coating layer of each of the second micro structures.

14. The backlight module of claim 11, wherein the size of the first coating layer of each of the first micro structures is different from the size of the first coating layer of each of the second micro structures.

15. The backlight module of claim 11, wherein the index of refraction of the first coating layers of the first micro structures and the second micro structures is substantially the same as the index of refraction of the transparent substrate.

16. The backlight module of claim 11, wherein the width of the first coating layers or the second coating layers of the first micro structures and the second micro structures is about 0.1-500 μm.

17. The backlight module of claim 11, wherein the thickness of the first coating layers or the second coating layers of the first micro structures and the second micro structures is about 0.1-50 μm.

* * * * *